United States Patent [19]
Amstutz et al.

[11] 4,170,027
[45] Oct. 2, 1979

[54] IMPLOSION RESISTANT CATHODE RAY TUBE AND FABRICATING PROCESS

[75] Inventors: O. Wendell Amstutz, Lima; William A. Dickinson; James F. Kreidler, both of Ottawa, all of Ohio

[73] Assignee: GTE Sylvania Incorporated, Stamford, Conn.

[21] Appl. No.: 890,080

[22] Filed: Mar. 27, 1978

[51] Int. Cl.[2] .......... H04N 5/65
[52] U.S. Cl. .......... 358/246; 220/2.1 A
[58] Field of Search .......... 358/246; 220/2.1 A

[56] References Cited

U.S. PATENT DOCUMENTS

| | | | |
|---|---|---|---|
| 3,162,933 | 12/1964 | Trax | 29/25.11 |
| 3,220,593 | 11/1965 | Powell | 220/2.1 A |
| 3,350,154 | 10/1967 | Minneman | 316/19 |
| 3,508,310 | 4/1970 | Eisses | 29/25.13 |
| 3,569,990 | 3/1971 | Inglis | 358/246 |
| 3,573,368 | 4/1971 | Kober | 358/246 |
| 3,730,990 | 5/1973 | Miyata | 358/246 |
| 3,777,057 | 12/1973 | Abe | 358/246 |

*Primary Examiner*—Howard W. Britton
*Attorney, Agent, or Firm*—Thomas H. Buffton

[57] ABSTRACT

An implosion-resistant cathode ray tube has an envelope with a flared portion sealed to a skirt portion joined to the viewing portion of a face plate member. A pair of substantially flat rimbands each has one or more bracket members affixed thereto and an adhesive applied to the inner surface thereof. The rimbands are positioned on the skirt portion rearward of the jointure of the viewing and skirt portions and formed to encircle and adhere to the skirt portion by a strap member applying a compression force to the rimbands.

The cathode ray tube is fabricated by selecting and positioning a pair of substantially flat rimbands in a jig for positioning brackets, welding the brackets to the rimbands, applying adhesive to the inner surface of the rimbands, placing the rimbands on the tube and encircling the rimbands with a strap member to form and compress the rimbands and adhere the adhesive to the skirt portion of the face plate member.

5 Claims, 4 Drawing Figures

Fig. 3
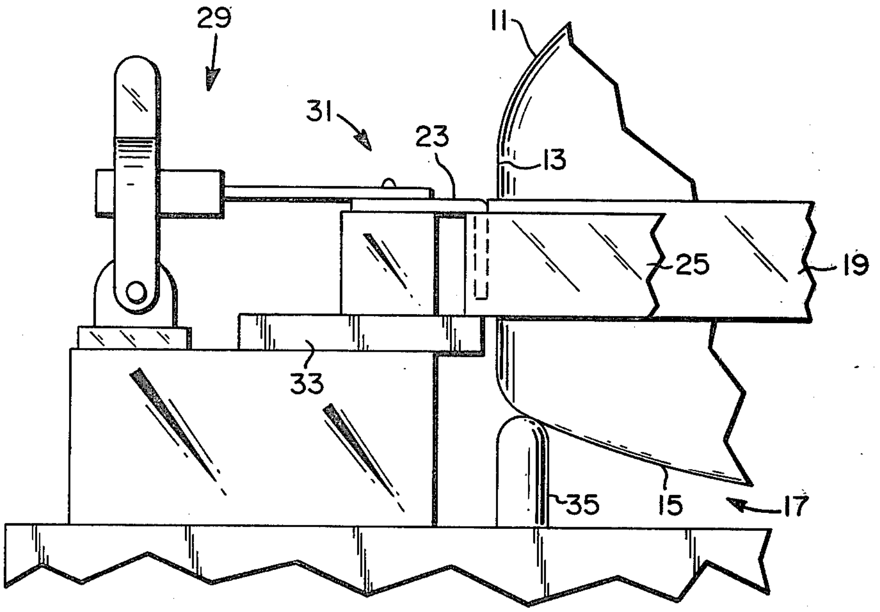
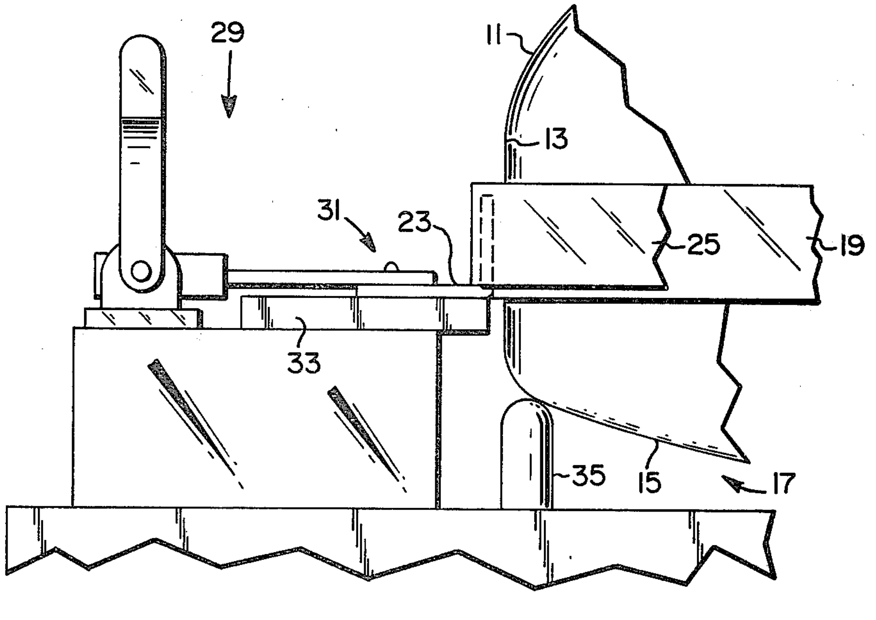
Fig. 4

IMPLOSION RESISTANT CATHODE RAY TUBE AND FABRICATING PROCESS

CROSS REFERENCE TO OTHER APPLICATIONS

A concurrently filed application bearing U.S. Ser. No. 890,079, entitled "Implosion-Resistant Cathode Ray Tube" filed in the names of J. Frederick Larson and Harry R. Swank relates to a cathode ray tube having a pair of rimbands with re-enforcing ridges compressively held by a tension band on the skirt portion of a face plate member. The skirt portion has a mould line and the rimbands are disposed intermediate the mould line and the jointure of the skirt and viewing portions of the face plate member.

BACKGROUND OF THE INVENTION

The present invention relates to implosion-resistant cathode ray tubes and more particularly to implosion-resistant cathode ray tubes having a panel member with a relatively smooth skirt portion whereon a pair of rimbands having affixed brackets are adhesively attached and compressively held by an encircling strap member.

The present art suggests a number of implosion-resistant cathode ray tube structures. One known technique requires a metal band which encircles the face plate of the tube and is shrunken to provide a compressive force thereon. Another technique provides first and second tension straps applied on top of one another.

In still another technique, rimbands contoured to conform to the viewing panel of a cathode ray tube are affixed thereto. Such rimbands are utilized with face plate members having a mould line and are disposed thereover in a manner such that the uneven surface of the mould line assists in maintaining the positional location of the rimband when a strap member is employed to effect a compressive force thereon.

Although the above-mentioned techniques have been and still are employed in numerous operations for fabricating implosion-resistant cathode ray tubes, it has been found that some tubes present special problems. Thus, the usual techniques are insufficient to provide the desired and required implosion protection.

More specifically, it has been found that the above-described contoured rimbands are relatively expensive to fabricate or purchase. Also, contoured rimbands have a tendency to "buckle" or deviate from the exact contour of the face plate whenever a compressive force is applied to the rimbands. Further, it has been found most difficult to maintain the positional location of rimbands on cathode ray tubes having a smooth skirt surface without a mould line. Moreover a separate safety panel cannot be used with contoured rimbands because of interference therebetween.

OBJECTS AND SUMMARY OF THE INVENTION

An object of the present invention is to provide an improved implosion-resistant cathode ray tube. Another object of the invention is to enhance the implosion-resistant capabilities of a cathode ray tube having a face plate member with a relatively smooth skirt portion. Still another object of the invention is to provide an improved implosion-resistant cathode ray tube having an enhanced appearance and fabricated at reduced component cost. A further object of the invention is to provide an improved process for fabricating an implosion-resistant cathode ray tube.

These and other objects, advantages and capabilities are achieved in one aspect of the invention by a cathode ray tube having a funnel member with a flared portion sealed to the skirt portion of a face plate member having a viewing portion. A pair of rimbands with brackets affixed thereto are jig mounted to encircle the skirt portion and are adhesively attached thereto. A strap member compresses the rimbands against the skirt portion of the panel member rearwardly of the jointure of the skirt and viewing portions.

Also, the cathode ray tube is fabricated by a process wherein a pair of substantially flat rimbands are located in a jig having designated positioned locations for brackets, the brackets are welded thereto, an adhesive is applied to the inner surface of the rimbands, the rimbands are located on the tube, and a strap member encircles the rimbands to contour the rimbands to the skirt portion of the face plate member and exert a compressive force thereon.

BRIEF DESCRIPTION OF THE DRAWINGS

FIG. 3 is a fragmentary cross-sectional view illustrating the technique for fabricating a bracketed cathode ray tube; and FIG. 4 is another fragmentary view illustrating an alternate bracket attachment embodiment.

DESCRIPTION OF THE PREFERRED EMBODIMENT

For a better understanding of the present invention, together with other and further objects, advantages and capabilities thereof, reference is made to the following disclosure and appended claims in conjunction with the accompanying drawings.

Figure 1:
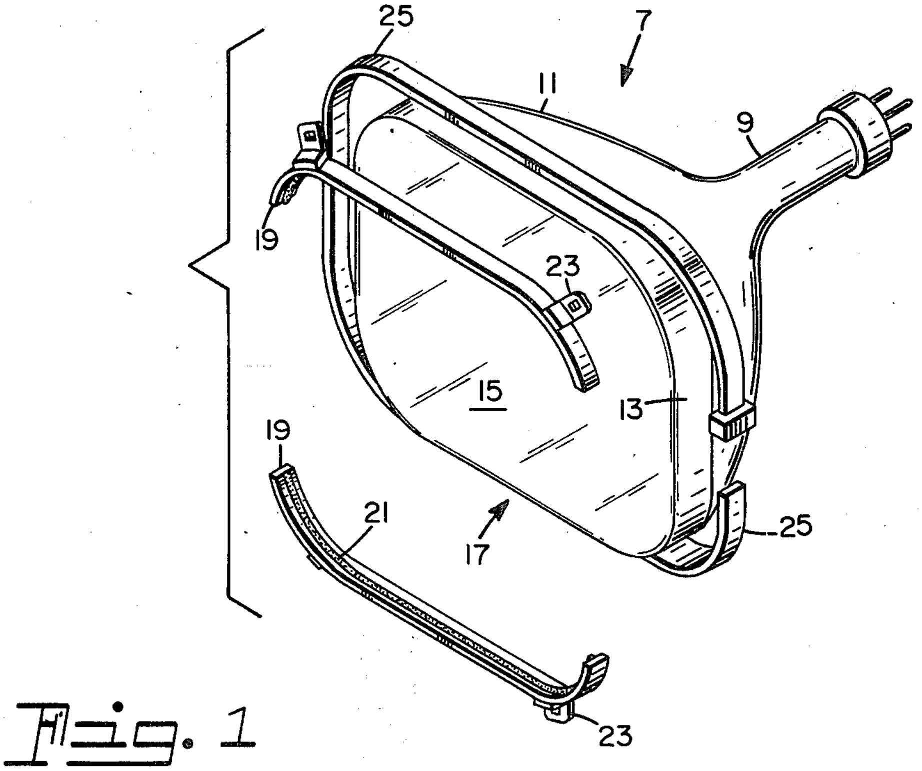
FIG. 1 is a perspective view of a cathode ray tube illustrating the implosion-resistant capabilities of the disclosure.

Referring to the drawings, FIG. 1 illustrates a cathode ray tube having a funnel member 7 which includes a neck portion 9 containing an electron gun and blending into a flared portion 11. The flared portion 11 is sealed to a skirt portion 13 extending along a substantially smooth surface to a jointure with a viewing portion 15 of a face plate member 17.

A pair of substantially flat rimbands 19 have an adhesive 21 on the inner surface thereof. The rimbands 19 essentially encircle the skirt portion 13 of the face plate member 17 with the adhesive 21 contacting and affixed to the skirt portion 13 of the face plate member 17. The rimbands 19 are positionally located rearward, toward the neck portion 9 of the cathode ray tube, of the jointure of the viewing and skirt portions 15 and 13 respectively, of the cathode ray tube.

Also, each of the rimbands 19 has at least one bracket member 23 affixed thereto at a given positional location and suitable for supporting the cathode ray tube for operational use. Moreover a strap member 25 under tensional force is applied to the rimbands 19 and serves to contour the rimbands 19 to the configuration of the skirt portion 13 of the face plate member 17 and to compress the rimbands 19 while enhancing adherence of the adhesive 21 to the skirt portion 13 of the face plate member 17.

Figure 2:
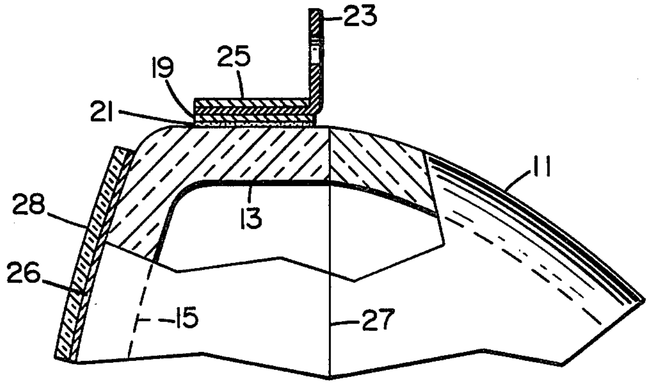
FIG. 2 is a sectional view of FIG. 1.

As can more clearly be seen in the cross-sectional view of FIG. 2, the rimbands 19 have a forward edge which is positionally located rearward of the jointure of the skirt and viewing portions 13 and 15 of the face plate member 17. Also, the skirt portion 13 tends to extend rather smoothly, without mould marks, from the jointure of the skirt and viewing portions 13 and 15 to a sealing line 27 of the skirt portion and flared portions 13 and 11. Further, the adhesive 21, rimbands 19 and strap member 25 substantially conform to and are compressively engaged with the relatively smooth skirt portion 13. Moreover, a safety panel 28 is preferably but, not necessarily, affixed to the viewing portion 15 of the face plate member 17 by transparent cement 26.

As to fabrication of the implosion-resistant cathode ray tube, reference is made to FIGS. 3 and 4 of the drawings. Therein, a jig member 29 includes a bracket position locating member 31 affixed to a support member 33 which is, in turn, spaced a given distance from an envelope support member 35.

In the fabrication process, the viewing portion 15 of the cathode ray tube is rested upon the envelope support member 35.

A pair of rimbands 19 have brackets 23 affixed thereto and the brackets contact and are held by the bracket position locating member 31. Thus, the relative positions of the bracket position locating member 31 and the support member 35 provide a consistent spacial distance between a reference point on the viewing surface 17 and the mounting brackets 23. Moreover, the brackets 23 and the rimbands 19 are positionally located with respect to the periphery of the skirt portion 13 by the bracket position locating member 31 and the support member 35.

Thereafter, a strap member 25 is threaded intermediate the rimbands 19 and the bracket positioning locating member 31 and supported by the support member 33. Thus, the strap member 25 encircles the rimbands 19 and is positioned substantially in alignment with the forward edges thereof. Tension is applied to the strap member 25 to effect a compressive force upon the encircled rimbands 19. Thus, the rimbands 19 as well as the brackets 23 are positionally located and positionally held at a desired location on the skirt portion 13 by the compressed adhesive 21 and the compression exerted by the strap member 25.

In FIG. 4, wherein the numbers correspond to the numbers of FIG. 3 it can be readily seen that the bracket member 23 may also be positioned in substantial alignment with the forward edge of the rimbands 19. Accordingly, the bracket members 23 are positionally located intermediate the rimbands 19 and the jointure of the skirt and viewing portions 13 and 15 of the face plate member 17.

Thus, there has been provided a unique implosion-resistant cathode ray tube and fabrication process especially suitable for cathode ray tube structures employing a face plate member having a relatively smooth skirt portion and a safety panel affixed to a viewing portion. The combination of relatively flat rimbands and a face plate member with a smooth skirt portion permits utilization of a safety panel without undesired interference therebetween while the adhesive affixed to the flat rimbands assists in securely affixing the rimbands to the relatively smooth skirt portion of the face plate member.

While there has been shown and described what is at present considered a preferred embodiment of the invention, it will be obvious to those skilled in the art that various changes and modifications may be made therein without departing from the invention as defined by the appended claims.

What is claimed is:

1. A cathode ray tube having an envelope resistant to fracture and implosion upon breakage comprising a funnel member having a neck portion with at least one electron gun sealed therein and tapering to a flared portion;

a face plate member having a viewing portion joined to a rearwardly extending skirt portion sealed to said flared portion of said funnel member;

a pair of substantially flat rimbands each having at least one bracket member affixed thereto at a given positional location and an adhesive affixed to the inner surface thereof, said rimbands formed to encircle and adhere to said skirt portion of said face plate member rearwardly of the jointure of said viewing and skirt portions of said face plate member; and a strap member encircling and applying tension to said pair of rimbands to effect compression thereof against said skirt portion of said face plate member.

2. The cathode ray tube of claim 1 including a safety panel member affixed to and substantially covering said viewing portion of said face plate member.

3. The cathode ray tube of claim 1 wherein said skirt portion extends without substantial irregularity intermediate the jointure of said viewing and skirt portions and said seal of said skirt and flared portions with said substantially flat encircling rimbands adhered to and tensionally compressing said substantially smooth skirt portion.

4. The cathode ray tube of claim 1 wherein each of said bracket members includes a mounting surface and said mounting surfaces are intermediate said viewing portion of said face plate member and said rimbands.

5. The cathode ray tube of claim 1 wherein each of said bracket members includes a mounting surface and said mounting surfaces are intermediate said rimbands and said neck portion of said funnel member.

* * * * *